United States Patent
De Backer et al.

(10) Patent No.: US 12,488,463 B2
(45) Date of Patent: Dec. 2, 2025

(54) METHOD FOR DIMENSIONAL MEASUREMENT OF A VESSEL

(71) Applicant: FLUIDDA RESPI NV, Kontich (BE)

(72) Inventors: Jan De Backer, Atlanta, GA (US); Stijn Bonte, Ghent (BE); Maarten Lanclus, Vremde (BE)

(73) Assignee: Fluidda Respi NV, Kontich (BE)

( * ) Notice: Subject to any disclaimer, the term of this patent is extended or adjusted under 35 U.S.C. 154(b) by 315 days.

(21) Appl. No.: 18/272,899

(22) PCT Filed: Jan. 26, 2022

(86) PCT No.: PCT/EP2022/051712
§ 371 (c)(1),
(2) Date: Jul. 18, 2023

(87) PCT Pub. No.: WO2022/161986
PCT Pub. Date: Aug. 4, 2022

(65) Prior Publication Data
US 2024/0095925 A1    Mar. 21, 2024

(30) Foreign Application Priority Data
Jan. 26, 2021   (EP) .................................... 21153557

(51) Int. Cl.
*G06T 7/00*     (2017.01)
*A61B 5/00*     (2006.01)
(Continued)

(52) U.S. Cl.
CPC ........ *G06T 7/0016* (2013.01); *A61B 5/02007* (2013.01); *A61B 5/08* (2013.01);
(Continued)

(58) Field of Classification Search
CPC ..... A61B 5/02007; A61B 5/08; A61B 5/1075; A61B 5/1079; A61B 5/4848; A61B 6/504;
(Continued)

(56) References Cited

U.S. PATENT DOCUMENTS

2012/0078099 A1 *   3/2012   Suri ...................... A61B 8/483
                                                        600/440

FOREIGN PATENT DOCUMENTS

CN         105389810 B      6/2019
JP         2012-519902 A    8/2012
(Continued)

OTHER PUBLICATIONS

Dai et al., "OCT Imaging for the Management of Pulmonary Hypertension", JACC: Cardiovascular Imaging, Aug. 2014, 7(8): 843-845.
(Continued)

*Primary Examiner* — Manuchehr Rahmjoo
(74) *Attorney, Agent, or Firm* — Lathrop GPM LLP; James H. Velema

(57) ABSTRACT

A method for dimensional measurement of a vessel (100) of a subject that is a bodily fluid-conducting vessel comprising: receiving image data comprising a three-dimensional medical image containing the vessel; obtaining from the image data an image patch (130) that is a two-dimensional image containing a transverse cross-section of the vessel (100); generating from the image patch (130), a set of rays (R1 to RX), wherein each ray (R1 to RX) is a straight line, one end contacting a centre point (140) of the outer footprint (150) of the vessel (100) and at the other end extending beyond the outer footprint (150) of the vessel (100), wherein each ray (R1 to RX) has a different direction; determining for each ray (R1 to RX) an image intensity profile of the image patch
(Continued)

(130) along the ray as a function of distance from the centre point (140); determining from the image intensity profile along each ray (R1 to RX), one or more of a ray wall thickness (RXwt), a ray lumen radius (RXlr), a ray outer radius (RXor); determining dimensional measurements of the vessel (100) comprising one or more of: a vessel wall thickness (Vwt) determined from a median of the ray wall thicknesses (RXwt) in the set of rays (R1 to RX), a vessel lumen radius (Vlr) determined from a median of the ray lumen radii (RXlr) in the set of rays (R1 to RX), a vessel outer radius (Vor) determined from a median of the ray outer radii (RXor) in the set of rays (R1 to RX).

23 Claims, 3 Drawing Sheets

(51) Int. Cl.
*A61B 5/02* (2006.01)
*A61B 5/08* (2006.01)
*A61B 5/107* (2006.01)

(52) U.S. Cl.
CPC .......... *A61B 5/1075* (2013.01); *A61B 5/1079* (2013.01); *A61B 5/4848* (2013.01); *G06T 2207/30061* (2013.01); *G06T 2207/30101* (2013.01)

(58) Field of Classification Search
CPC ....... G06T 2200/04; G06T 2207/10081; G06T 2207/10088; G06T 2207/10104; G06T 2207/20004; G06T 2207/20044; G06T 2207/30061; G06T 2207/30101; G06T 2207/30172; G06T 7/0012; G06T 7/0016; G06T 7/11; G06T 7/136; G06T 7/62
See application file for complete search history.

(56) References Cited

FOREIGN PATENT DOCUMENTS

| | | |
|---|---|---|
| JP | 2014-073401 A | 4/2014 |
| JP | 2018-501898 A | 1/2018 |
| JP | 2019-122762 A | 7/2019 |
| WO | WO 2010/101660 A2 | 9/2010 |
| WO | WO 2016/113690 A1 | 7/2016 |

OTHER PUBLICATIONS

Frangi et al., "Multiscale Vessel Enhancement Filtering", in Medical Image Computing and Computer-Assisted Antervention, MICCA, 1998, Lecture Notes in Computer Science, Feb. 2000, 1496: 130-137.

International Search Report and Written Opinion for PCT International Patent Application No. PCT/EP2022/051712, dated May 17, 2022.

Lins et al., "Assessment of Small Pulmonary Blood Vessels in COVID-19 Patients Using HRCT", Academic Radiology, Oct. 2020, 27(10): 1449-1455.

Mumcuoglu et al., "Image analysis for cystic fibrosis: Automatic lung airway wall and vessel measurement on CT images", Proceedings of the 31st Annual International Conference of the IEEE Engineering in Medicine and Biology Society: Engineering the Future of Biomedicine, EMBC 2009, IEEE, Sep. 3, 2009, pp. 3545-3548.

Rudyanto et al., "Quantification of pulmonary vessel diameter in low-dose CT images", Progress in Biomedical Optics and Imaging, Spie—International Society For Optical Engineering, Mar. 20, 2015, 9414: 94142U.

* cited by examiner

METHOD FOR DIMENSIONAL MEASUREMENT OF A VESSEL

RELATED APPLICATIONS

The instant application is a 35 U.S.C. § 371 filing of International Patent Application No. PCT/EP2022/051712, filed Jan. 26, 2022, which claims priority to European Patent Application No. 21153557.0, filed Jan. 26, 2021, the entire contents of which are incorporated herein by reference for all purposes.

FIELD OF THE INVENTION

The present invention is in the field of dimensional measurements of a vessel. It in particular relates to a non-invasive using 3D medical imagining. It concerns in a particular aspect automated dimensional measurements of a vessel in an organ or system

BACKGROUND TO THE INVENTION

Described herein is a non-invasive method for reliable measurement of one or more dimensions of a vessel of a subject. It is particularly suited to measurement of narrow vessels. The method allows diagnosis of dysfunction, and determination of efficacy of treatment.

SUMMARY OF SOME EMBODIMENTS OF THE INVENTION

Provided herein is a method for dimensional measurement of a vessel (100) of a subject that is a bodily fluid-conducting vessel comprising:
  receiving image data comprising a three-dimensional medical image containing the vessel;
  obtaining from the image data an image patch (130) that is a two-dimensional image containing a transverse cross-section of the vessel (100);
  generating from the image patch (130), a set of rays (R1 to RX), wherein each ray (R1 to RX) is a straight line, one end contacting a centre point (140) of the outer footprint (150) of the vessel (100) and at the other end extending beyond the outer footprint (150) of the vessel (100), wherein each ray (R1 to RX) has a different direction;
  determining for each ray (R1 to RX) an image intensity profile of the image patch (130) along the ray as a function of distance from the centre point (140);
  determining from the image intensity profile along each ray (R1 to RX), one or more of a ray wall thickness (RXwt), a ray lumen radius (RXlr), a ray outer radius (RXor);
  determining dimensional measurements of the vessel (100) comprising one or more of:
    a vessel wall thickness (Vwt) determined from a median of the ray wall thicknesses (RXwt) in the set of rays (R1 to RX),
    a vessel lumen radius (Vlr) determined from a median of the ray lumen radii (RXlr) in the set of rays (R1 to RX),
    a vessel outer radius (Vor) determined from a median of the ray outer radii (RXor) in the set of rays (R1 to RX).

The step of:
  determining from the image intensity profile along each ray (R1 to RX), one or more of a ray wall thickness (RXwt), a ray lumen radius (RXlr), a ray outer radius (RXor);
  may comprise fitting a double inverse sigmoid function to the image intensity profile along each ray (R1 to RX). The double inverse sigmoid function may be:

$$f(x) = \frac{A_1 - A_2}{1 + \exp\left(\frac{x - (r - d)}{\sigma}\right)} + \frac{A_2 - B}{1 + \exp\left(\frac{x - r}{\sigma}\right)} + B$$

wherein $A_1$ is vessel lumen (104) intensity, $A_2$ is vessel wall (102) intensity, B is background intensity, r is ray outer radius (RXor), d is ray wall thickness (RXwt) and sigma is a measure of imaging device resolution.

A plurality of image patches (130) may be obtained for one or more vessels within the same organ, system, or part thereof, thereby obtaining a plurality of vessel dimensional measurements within the same organ, system, or part thereof; and
  the plurality of image patches (130) is at different locations along the same vessel; or the plurality of image patches (130) is of different vessels within the same organ, system, or part thereof; or both.

The method may further comprise a step of generating a relationship map for the organ, or system, or part thereof, wherein the relationship map is a chart or data showing relationship between a first parameter that is the dimensional measurement for the organ, or system, or part thereof, and at least one subsequent parameter.

Further provided is a method for determining a dysfunction of an organ or system of a subject comprising:
  determining dimensional measurements of vessels (100) within the organ or system or part thereof according to the method as described herein;
  optionally generating a relationship map;
  comparing the dimensional measurements and/or optional relationship map with a reference, thereby determining a dysfunction of an organ or system of the subject.

Further provided is a method for determining a dysfunction of the lung comprising:
  receiving dimensional measurements of vessels (100) within the lung or part thereof according to the according to the method as described herein, wherein the vessels are arterial, venous, or both arterial and venous,
  comparing the dimensional measurements with a reference thereby determining a dysfunction of an organ of the subject,
  optionally wherein the dimensional measurements of vessels (100) of the lung include vessel wall thickness (Vwt), in particular arterial vessel wall thickness (Vwt), and the dysfunction is pulmonary hypertension.

Further provided is a method for determining a dysfunction of the lung comprising:
  generating a relationship map for the lung or part thereof that is a Blood-Radius-Thickness (BRTX) relationship map, wherein a first parameter of the relationship map is lung vascular vessel wall thickness (Vwt) in the lung or part thereof determined according to a method as described herein, and a subsequent (2nd) parameter of the relationship map is lung vascular vessel radius at the position at which the vessel wall thickness was measured;

comparing the relationship map with a reference,
optionally wherein the vessel wall thickness (Vwt) is arterial, and the dysfunction is pulmonary hypertension.

Further provided is a method for determining a dysfunction of the lung comprising:
generating a relationship map for the lung or part thereof that is a Blood-Volume-Thickness (BVTX) relationship map, wherein a first parameter of the relationship map is lung vascular vessel wall thickness (Vwt) in the lung or part thereof determined according to a method as described herein, and a subsequent (2nd) parameter of the relationship map is lung vascular vessel volume at the position at which the vessel wall thickness was measured.
comparing the relationship map with a reference,
optionally wherein the vessel wall thickness (Vwt) is arterial, and the dysfunction is pulmonary hypertension.

Further provided is a method for determining an efficacy of a treatment for dysfunction of an organ or system of a subject comprising:
determining, at at least two different time points, dimensional measurements of vessels (100) within the organ or system or part thereof according to the method as described herein;
optionally generating a relationship map for each of the different time points,
comparing the dimensional measurements and/or optional relationship map at the different time points to determine the efficacy of the treatment.

Further provided is a method for determining an efficacy of a treatment for dysfunction of a lung of a subject comprising:
determining, at at least two different time points, dimensional measurements of vessels (100) within the lung or part thereof according to the method as described herein;
comparing the dimensional measurement at the different time points to determine the efficacy of the treatment.
optionally wherein the dimensional measurements of vessels (100) of the lung include vessel wall thickness (Vwt), in particular arterial vessel wall thickness (Vwt), and the dysfunction is pulmonary hypertension.

Further provided is a method for determining an efficacy of a treatment for dysfunction of a lung of a subject comprising:
determining, at at least two different time points, dimensional measurements of vessels (100) within the lung or part thereof according to the method as described herein;
generating, for each time point, a relationship map that is a BRTX relationship map as described herein or BVTX relationship map as described herein;
comparing the respective relationship maps at the different time points to determine the efficacy of the treatment;
optionally wherein the vessel wall thickness (Vwt) is arterial, and the dysfunction is pulmonary hypertension.

Further provided is a system configured to carry out the method as described herein.

Further provided is a computer program or computer program product having instructions which when executed by a computing device or system cause the computing device or system to perform the method as described herein.

FIGURE LEGENDS

DETAILED DESCRIPTION OF THE INVENTION

Figure 1:
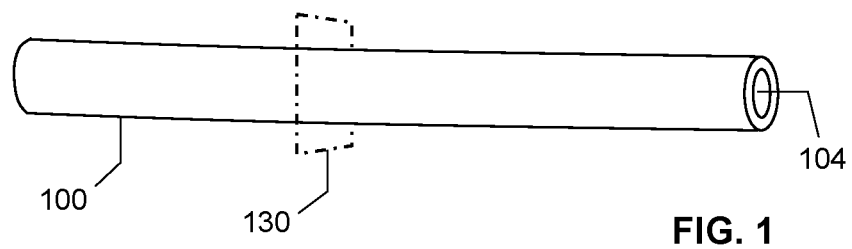
FIG. 1 shows a view of a part of a vessel and a plane thereon which is an image patch.

Before the present methods and systems of the invention are described, it is to be understood that this invention is not limited to particular methods, systems or combinations described, since such methods, systems and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any or etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

In the present description of the invention, reference is made to the accompanying drawings that form a part hereof, and in which are shown by way of illustration only of specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 2:
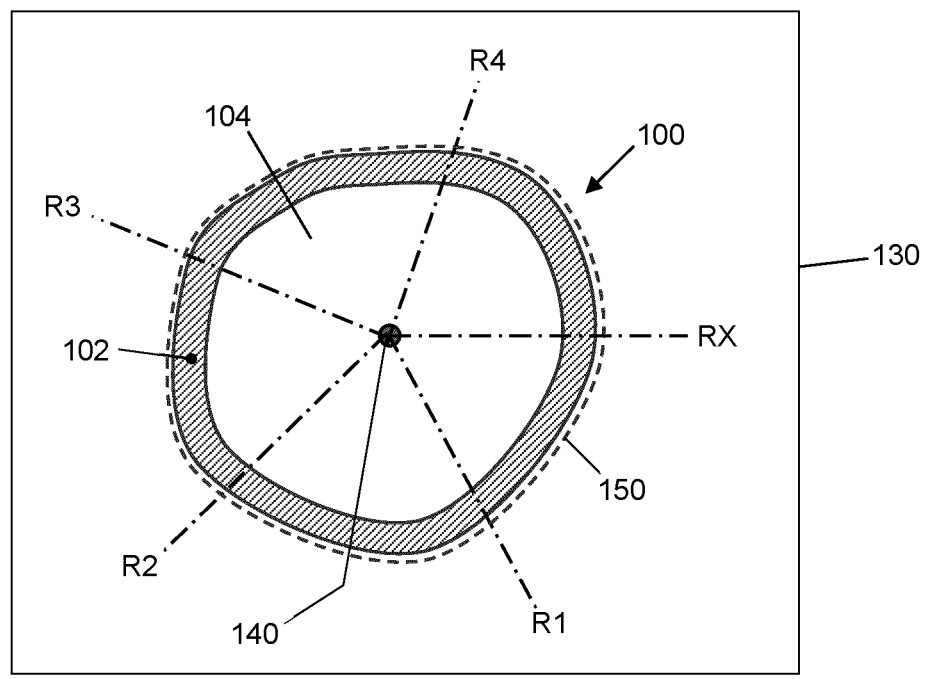
FIG. 2 shows an image patch of a vessel, with centrepoint and rays indicated thereon.
Figure 3:
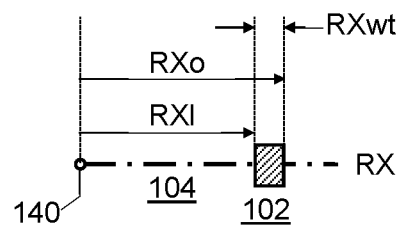
FIG. 3 shows a view of a ray (RX) over part of an image patch, with dimensional measurement determined from the ray.
Figure 4:
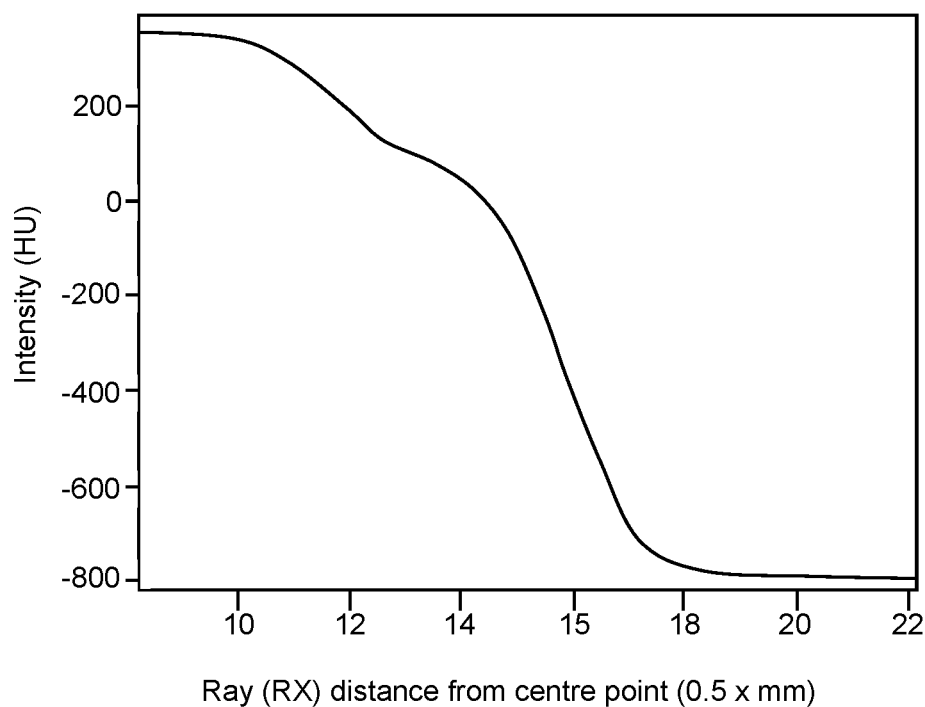
FIG. 4 shows an intensity profile (Houndsfield unit (HU) scale) along a ray (RX).
Figure 5:
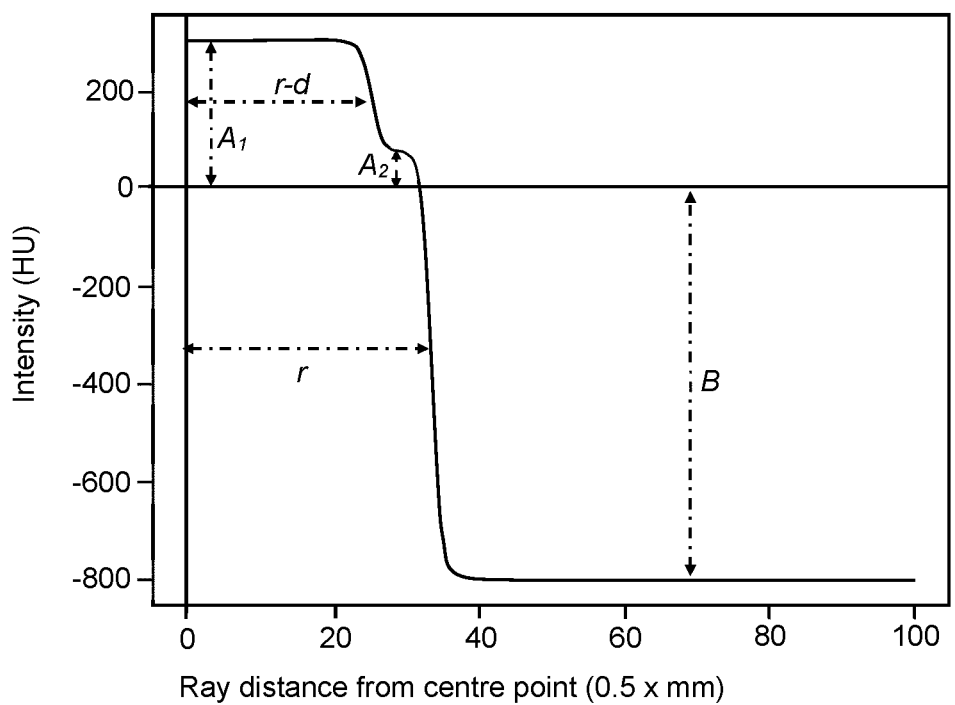
FIG. 5 shows an exemplary double inverse sigmoid curve to be fitted to the Ray intensity profile, and the dimensional measurement determined from the fitting.

Provided herein is a method for obtaining dimensional measurement data of a vessel (100) of a subject that is a bodily fluid-conducting vessel. Reference is made in this description to FIGS. 1 and 2. The method receives image data comprising a 3-dimensional (3D) medical image of the subject containing the vessel (100). An image patch (130) is obtained from the image data, that is a two-dimensional image containing a transverse cross-section of the vessel (100). A set of rays (R1 to RX) is generated, wherein each ray (R1 to RX) is a straight line; one end contacting a centre point (140) of an outer footprint (150) of the vessel (100) extending beyond the outer footprint (150) of the vessel (100) to the vessel exterior (106). Each ray has a different direction. For each ray (R1 to RX) an image intensity profile of the image patch (130) along the ray as a function of distance from the centre point (140) is determined. From the image intensity profile along each ray (R1 to RX), one or more (preferably all) of a ray wall thickness (RXwt), a ray lumen radius (RXlr), and a ray outer radius (RXor), is determined. For the vessel (100), the vessel lumen (104) radius (Vlr) may be determined from the median of the ray lumen radius (RXlr) values in the set of rays (R1 to RX). For the vessel (100), the vessel outer radius (Vor) may be determined from the median of the ray outer radius (RXor) values in the set of rays (R1 to RX). For the vessel, the vessel wall (102) thickness (Vwt) may be determined from the median of the ray wall thickness (RXwt) values in the set of rays (R1 to RX).

The use of a plurality of rays (T1 to RX) each having a different direction overcomes the problem of image resolution and dimensional measurement of smaller vascular vessels. By using the median value instead of the average, the method is more robust against outliers or unstable values in one or more rays.

The dimensional measurement data refers to dimensional measurement of the vessel obtained directly from or derived from the patch (130). From the patch (130), one or more (preferably all of) vessel lumen radius (Vlr), a vessel outer radius (Vor), vessel wall thickness (Vwt) may be directly measured.

From the direct dimensional measurements, other dimensional measurements can be derived (derived dimensional measurements). Examples of a derived dimensional measurement includes footprint volume, lumen volume, vessel wall volume.

It is appreciated that a direct measurement of any two of Vlr, Vor and Vwt allows the other parameter to be derived. For instance, Vlr may be derived from Vor−Vwt; Vor may be derived from Vlr+Vwt; and Vwt may be derived from Vor-Vlr.

A ray (R1-RX) is a straight line originating from a centrepoint (140) of the outer footprint (150) of the vessel (100) and which extends beyond the outer footprint (150). For each patch (130), a plurality of rays (R1-RX) is generated, for instance, 5, 10, 15, 20, or more, preferably 18 to 22. Each ray has a different direction. The rays of different direction may have approximately equal angular spacing around the centrepoint (140). For instance, each of 20 rays may be separated by an angle of 16-22 deg.

The image intensity (radiodensity) of the patch (130) is determined along the ray (R1-RX), resulting in an image intensity profile along each ray (R1 to RX). The method used to determine intensity may be any, for instance, according to the Houndsfield unit (HU) scale.

The image intensity profile along the ray (RX) of a patch (130) allows a determination of one or more of RXlr, RXor, and RXwt. The ray image intensity undergoes a change from high intensity to low intensity as a function of distance away from the centrepoint (140). A primary change is observed in a transition from the lumen (104) to vessel exterior (106). A secondary change is observable in a transition across the vessel wall (102). A double inverse sigmoid function may be fitted to the image intensity profile along the ray (RX). According to one preferred embodiment, the double inverse sigmoid function is equation [1]:

$$f(x) = \frac{A_1 - A_2}{1 + \exp\left(\frac{x - (r - d)}{\sigma}\right)} + \frac{A_2 - B}{1 + \exp\left(\frac{x - r}{\sigma}\right)} + B \quad [1]$$

where $A_1$ is vessel lumen (104) intensity, $A_2$ is vessel wall (102) intensity, B is background intensity (e.g. vessel exterior (106)), r is ray outer radius (RXor), d is ray wall thickness (RXwt) and sigma is full width at half-maximum of the point spread function, a measure for the resolution of the imaging device. In the fitting protocol, parameters (A1, A2, B, r, d, sigma) may be optimised.

The 3-dimensional (3D) medical image may be any, for instance, acquired by X-ray computed tomography (CT), magnetic resonance imaging (MRI), positron emission tomography (PET). Imaging may be performed with or without contrast agent. Imaging may be performed with or without enhancement. One method may be preferred depending on the type and size of vessel being measured.

The vessel may be any kind of bodily fluid-conducting vessel such as a blood vessel, lymph vessel. Preferably it is a blood vessel. The blood vessel may be arterial (including one or more of arteries, arterioles and capillaries), or venous (including one or more of veins, venules and capillaries).

A plurality of image patches (130) may obtained for one or more vessels within the same organ, or system, or part thereof (i.e. part of the organ, or part of the system). Preferably image patches (130) may obtained for a majority, preferably all of vessels within the same organ, or system, or part thereof. A system may refer to a collection of organs such as found in the digestive system. A system may refer to a collection of vessels such as a vasculature generally.

From the plurality of image patches (130), a plurality of dimensional measurements of the vessel (100) may be determined. The plurality of dimensional measurements or of image patches (130) may be at different locations along the same vessel (100); or different vessels within the same organ, or system, or part thereof; or both. The plurality of dimensional measurements or image patches (130) may be obtained for one vessel type (e.g. arterial, venous) within the same organ, or system, or part thereof. The plurality of dimensional measurements or image patches (130) may be obtained for multiple vessel types (e.g. arterial and venous) within the same organ, or system, or part thereof. Preferably, a plurality of image patches (130) is obtained for a majority of arterial vessels within a lung or part thereof of a subject.

A relationship map may be generated for an organ, or system, or part thereof. A relationship map is a chart or data indicating relationship between a first parameter and at least one subsequent (e.g. $2^{nd}$, $3^{rd}$, $4^{th}$ or further) parameter. The relationship map be expressed a chart or graph (e.g. OVA, OVT, BRTX, BVX—see later below). In an x-y plot, either the first parameter or subsequent parameter may be disposed along the x-axis. The relationship map be data that is a listing of first parameter and related subsequent parameter, without or without additional processing steps. The data may be one or more scalar values resulting from processing the first parameter and related subsequent parameter (e.g. BV5, BV5-10 and BV10—see later below). The first parameter is a dimensional measurement for organ, or system, or part thereof (e.g. one of Vlr, Vor and Vwt, or a derivative thereof) measured according to the method described herein. The subsequent parameter may be a dimensional measurement for the organ, or system, or part thereof (e.g. one of Vlr, Vor and Vwt, or a derivative thereof) measured as described herein that is different from the first parameter. The subsequent parameter maybe a dimensional measurement for the organ, or system, or part thereof measured according to a different technique (e.g. Frangi vesselness method). The subsequent parameter may be another property of the organ, or system, or part thereof.

According to one example, a relationship map is an Organ-Volume-Area (OVA) relationship map, wherein first parameter is vessel outer cross-sectional area (mm$^2$) in the organ, or system, or part thereof, and the subsequent ($2^{nd}$) parameter is vascular volume of the vessel at the position at which the vessel outer cross-sectional area was measured. The first parameter is derived from the vessel outer radius (Vor) determined according to present method, or an alternative method (e.g. Frangi vesselness method. See also step d) below). The subsequent parameter is derived from volumetric segmentation of the vessel (e.g. Frangi vesselness method. See also step b) below). It is preferred that the subsequent ($2^{nd}$) parameter expresses the vascular volume as a fraction or percentage of the total organ, or system, or part thereof. The relationship map shows, for the organ, or system, or part thereof, the spread of vascular volumes at each value of vessel outer cross-sectional area.

According to another example, a relationship map is an Organ-Volume-Thickness (OVT) relationship map, wherein first parameter is vessel wall thickness (e.g. mm) in the organ, or system, or part thereof, and the subsequent ($2^{nd}$) parameter is vascular volume of the vessel at the position at which the vessel wall thickness was measured. The first parameter is derived from the vessel wall thickness (Vwt) determined according to present method, and the subsequent parameter may be derived from volumetric segmentation of the vessel (e.g. Frangi vesselness method. See also step b) below). It is preferred that the subsequent ($2^{nd}$) parameter expresses the vascular volume as a fraction or percentage of the total organ, or system, or part thereof. The relationship map shows, for the organ, or system, or part thereof, the spread of vascular volumes at each value of vessel wall thickness.

Figure 6:
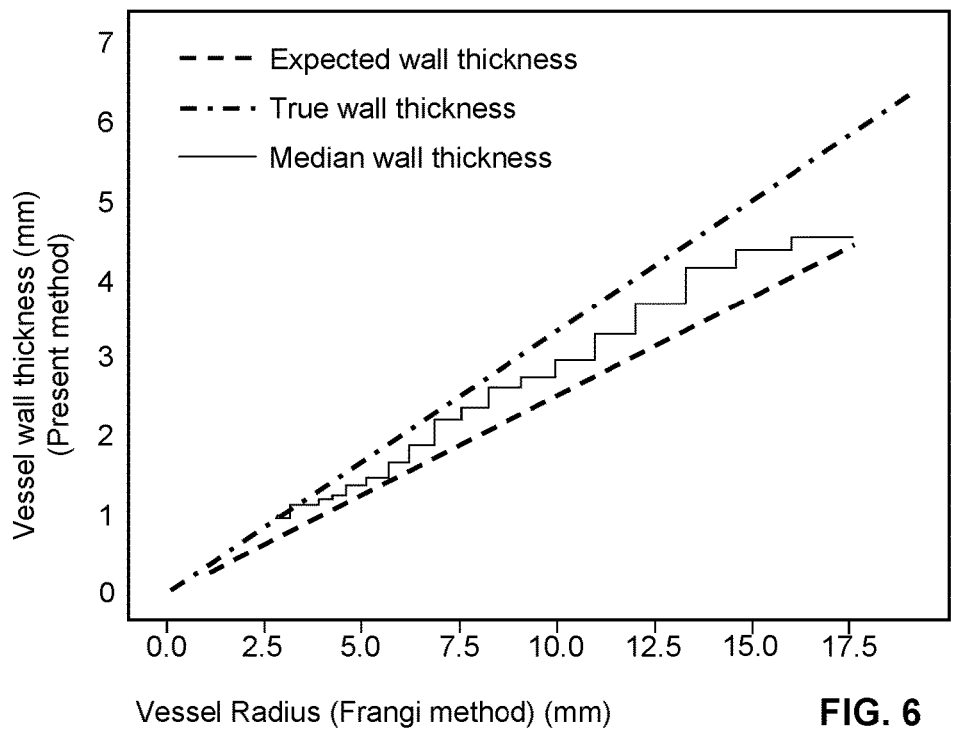
FIG. 6 shows a BRTX relationship map having a first parameter (y-axis) that is vessel wall thickness (Vwt) as measured herein and a subsequent ($2^{nd}$) parameter (x-axis) that is vessel radius as measured by the Frangi vesselness method; the graph is result of a validation of the present dimensional measurement technique performed on a 3D phantom.
Figure 7:
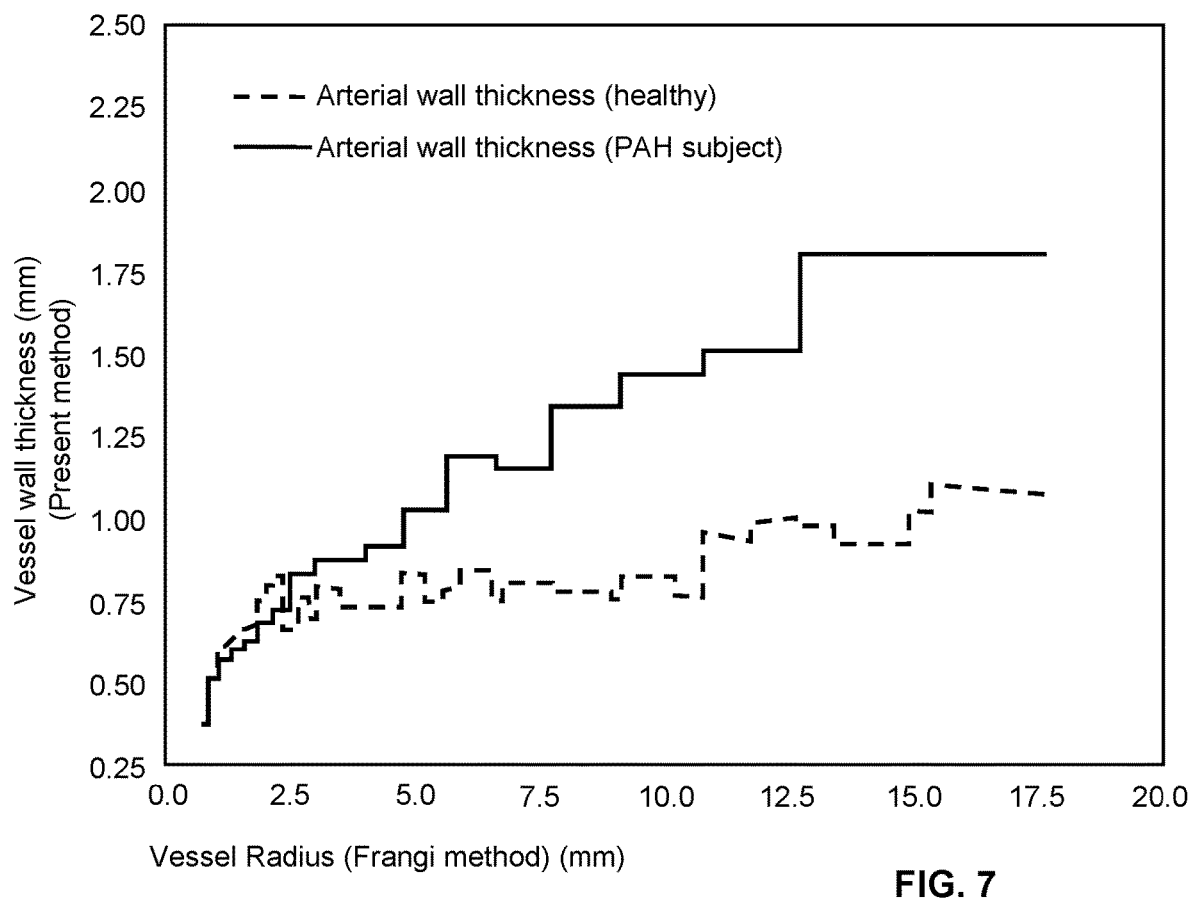
FIG. 7 shows a BRTX relationship map having a first parameter (y-axis) arterial vessel wall thickness (Vwt) as measured herein and a subsequent ($2^{nd}$) parameter (x-axis) vessel radius as measured by the Frangi vesselness method; the graph is a result of an experiment to determine vessel wall thickness in lungs of a subject with pulmonary arterial hypertension compared with a healthy subject.

According to another example, a relationship map is a Blood-Radius-Thickness (BRTX) relationship map, wherein first parameter is lung vascular vessel (arterial, venous or both) wall thickness (e.g. mm) in the lung or part thereof, and the subsequent ($2^{nd}$) parameter is outer vessel radius (e.g. mm) at the position at which the vessel wall thickness was measured. The first parameter is derived from the lung vascular vessel wall thickness (Vwt) determined according to present method, and the subsequent parameter is derived from lung vascular vessel outer radius determined according to the Frangi vesselness method (e.g. see step d) below). The relationship map shows, for the lung or part thereof, the spread of vessel wall thickness as a function of vessel radius. Changes in the BRTX map can be seen in subject with pulmonary hypertension; a significantly increased vessel wall thickness, in particular arterial vessel wall thickness, in wider lung blood vessels (arterial >5 mm$^2$) was observed compared with healthy subjects. The relationship may be expressed as a graph with the subsequent ($2^{nd}$) parameter along the x-axis and the first parameter along the y-axis. Exemplary BRTX relationship maps are shown in FIGS. 6 and 7.

According to another example, a relationship map is a Blood-Volume-Thickness (BVTX) relationship map, wherein first parameter is lung vascular vessel (arterial, venous or both) wall thickness (e.g. mm) in the lung or part thereof, and the subsequent ($2^{nd}$) parameter is lung vascular vessel (arterial, venous or both) volume at the position at which the vessel wall thickness was measured. The first parameter is derived from the lung vascular vessel wall thickness (Vwt) determined according to present method, and the subsequent parameter is derived from lung vascular vessel segmentation (e.g. Frangi vesselness method. See also step b) below). The relationship map shows, for the lung or part thereof, the spread of vascular volumes (indicative of blood volumes held in the lung vasculature) at each value of lung vascular vessel wall thickness. Changes in the BVTX map can be seen in subject with pulmonary hypertension; a significantly increased vessel wall thickness in wider lung blood vessels (arterial >5 mm$^2$) was observed compared with healthy subjects.

According to one example, a relationship map is a Blood-Volume-Area (BVX) relationship map, wherein first parameter is a lung vascular vessel (arterial, venous or both) outer cross-sectional area (mm$^2$) in the lung or part thereof, and the subsequent ($2^{nd}$) parameter is lung vascular vessel (arterial, venous or both) volume at the position at which the vascular vessel outer cross-sectional area was measured. The first parameter is derived from the lung vascular vessel outer radius (Vor) determined according to present method, and the subsequent parameter is derived from lung vascular vessel segmentation (e.g. Frangi vesselness method. See also step b) below). The relationship map shows, for the lung or part thereof, the spread of vascular volumes (indicative of blood volumes held in the lung vasculature) at each value of vascular vessel outer cross-sectional area. Changes in the BVX map can be seen in subject with COVID-19; a significantly reduced vascular volume in smaller calibre lung blood vessels (arterial and venous) was observed compared with healthy subjects.

According to another example, a relationship map indicates one or more of BV5, BV5-10 and BV10.

In BV5, the first parameter is vascular vessel (arterial, venous or both) outer cross-sectional area ($mm^2$) in the lung or part thereof which outer cross-sectional area is below 5 $mm^2$, and the subsequent ($2^{nd}$) parameter is total vascular volume of the lung—namely the total volume of arterial and venous vessels. The first parameter is derived from the lung vascular vessel outer radius (Vor) determined according to present method, and the subsequent parameter is derived from derived from volumetric segmentation of the vessel (e.g. Frangi vesselness method. See also step b) below). The relationship map shows, for the lung or part thereof, the quantity of lung vascular volume (indicative of blood volumes held in the lung vasculature) having an outer cross-sectional area below 5 $mm^2$. Currently, BV5 has a lower limit of resolution (1.25 $mm^2$) though this limit is contingent on the resolution of contemporary imaging technology and not essential to the method.

In BV10, the first parameter is vascular vessel (arterial, venous or both) outer cross-sectional area ($mm^2$) in the lung or part thereof which outer cross-sectional area is equal to or above 5 $mm^2$ and is equal to or below 10 $mm^2$, and the subsequent ($2^{nd}$) parameter is total vascular volume of the lung—namely the total volume of arterial and venous vessels. The first parameter is derived from the lung vascular vessel outer radius (Vor) determined according to present method, and the subsequent parameter is derived from derived from volumetric segmentation of the vessel (e.g. Frangi vesselness method. See also step b) below). The relationship map shows, for the lung or part thereof, the quantity of lung vascular volume (indicative of blood volumes held in the lung vasculature) having an outer cross-sectional area equal to or above 5 $mm^2$ and is equal to or below 10 $mm^2$. In BV10, the first parameter is vascular vessel (arterial, venous or both) outer cross-sectional area ($mm^2$) in the lung or part thereof which outer cross-sectional area is above 10 $mm^2$, and the subsequent ($2^{nd}$) parameter is total vascular volume of the lung—namely the total volume of arterial and venous vessels. The first parameter is derived from the lung vascular vessel outer radius (Vor) determined according to present method, and the subsequent parameter is derived from derived from volumetric segmentation of the vessel (e.g. Frangi vesselness method. See also step b) below). The relationship map shows, for the lung or part thereof, the quantity of lung vascular volume (indicative of blood volumes held in the lung vasculature) having an outer cross-sectional area above 10 $mm^2$. The values of BV-5, BV5-10 and BV10 may also be indicative of dysfunctions, such as acute respiratory distress syndrome (ARDS) seen in subjects with COVID-19.

The subject is preferably a human subject. It may alternatively, be an animal subject e.g. mammalian such as primate, mice, pig.

The method for obtaining dimensional measurement data of a vessel (100) may be applied in an automatic or semi-automatic way to an organ, or to system, or part thereof. Hence, dimensional measurements Vlr, Vor and Vwt and derivatives thereof may be automatically generated for a network of vessels from a 3 dimensional medical image. The automation may be applied to at least a majority of vessels of the same or different types. Accordingly, provided herein is a method for dimensional measurement of vessels within an organ or system or parts thereof; the method may be automatic or semi-automatic.

Automating dimensional measurement data of a vessel (100) within an organ, a system, or part thereof may comprise an automatic generation of image patches (130). An example of a protocol for automatic generation of image patches (130) of vessels within an organ or system or parts thereof is set out below. It is appreciated that additional intervening steps may be present, for example, to reduce noise, increase contrast, obtain more refined fitting, and the like.

A method for generation of image patches (130) of vessels within an organ or system or parts thereof comprises:
a) Receiving a three-dimension medical image of the organ, system or part thereof;
b) Segmenting the vessels from the medical image (e.g. using Frangi vesselness method combined with adaptive thresholding) to generate a segmented medical image. In segmentation, images of vessels are isolated from the background.
c) Normalising the segmented medical image towards a uniform voxel size. For instance, using tri-linear interpolation, the voxel size may be scaled to 0.75 mm×0.75 mm×0.75 mm, or to 0.5 mm×0.5 mm×0.5 mm;
d) Estimating, from the normalised segmented medical image, radii of vessels therein. (e.g. using Frangi vesselness method). The Frangi vesselness method may be used to estimate the best fitting sigma (parameter resembling width of the vesselness kernel, which can be converted to an approximation of vessel radius). Preferably, a high number of sigma's is used, e.g. 25 or more.
e) Calculating (from the normalised segmented medical image) vessel a centreline of each vessel, thereby generating a skeletonised vessel map. A thinning or skeletonization algorithm may be used (e.g. LEE, Ta-Chih; KASHYAP, Rangasami L.; CHU, Chong-Nam. Building skeleton models via 3-D medial surface axis thinning algorithms. *CVGIP: Graphical Models and Image Processing*, 1994, 56.6: 462-478).
f) Segmenting the skeletonised vessel map; the skeletonised vessel map is split into segments along a path of the vessel. The segmenting may be depend on the type of organ. In the case of a lung where the skeletonised vessel map has a tree-like structure, a new segment may be formed at each branch; a branch is where a single vessel splits off into two or more further vessels. In other cases, a new segment may be formed where the vessel path changes direction outside a certain tolerance.
g) Fitting a line to every segment. A line (e.g. spline curve) is fitted through points of the segment. This allows for the segment to be interpolated and a calculation of a local direction of the segment path.

h) Generating a plurality of image patches (130). Each image patch (130) is generated at points along the fitted line, and is perpendicular to the fitted line. For instance, a line fitted to a segment in step g) be disposed with N points, and image patch (130) is generated for every point N. N may be a value equal to the number of points in segment centreline (generated in step e) divided by 4.

i) Generating a set of rays (R1 to RX) for each image patch (130), wherein each ray (R1 to RX) is a straight line. Each ray is parallel to a plane of the patch. One end of a ray contacts a centre point (140) of an outer footprint (150) of the vessel (100), and the other end extends beyond the outer footprint (150) of the vessel (100) to the vessel exterior (106).

From the set of rays (R1 to RX), the one of more of vessel lumen radius (Vlr), vessel outer radius (Vor), vessel wall thickness (Vwt) can be measured according to the method described elsewhere herein.

The Frangi vesselness method (Frangi vesselness method (FRANGI, Alejandro F., et al. Multiscale vessel enhancement filtering. In: International conference on medical image computing and computer-assisted intervention. Springer, Berlin, Heidelberg, 1998. p. 130-137) is known in the art. It automatically identifies and characterizes en mass tubular structures within a medical image. It may be used to automatically segment vessels from a medical image, calculate radii and volumes. In brief, the Frangi vesselness method may yield for every image region two values: the vesselness (how tubular is the region), and the sigma (radius). The vesselness may be thresholded to obtain the segmented vessels; namely is selection is made of regions with a highly tubular appearance. These segmented vessels may be classified according to their radius into different categories, e.g. BV5 (vessels with an outer cross-sectional area smaller than 5 $mm^2$), BV5-10 (vessels with area between 5 and 10 $mm^2$, and the like. Alternatives to the Frangi vesselness method may be used.

Pulmonary hypertension (PH) refers to a diverse spectrum of conditions and disease processes which all result in changes to the pulmonary circulation which result in elevated pulmonary pressures (i.e. blood pressure in the lungs). This leads to progressive exercise intolerance and right heart disease, and many PH eventually die of right heart failure. Patients with PH are classified into one of five groups, depending on the underlying cause and clinical presentation. All types involve some degree of change to the structure of the pulmonary blood vessels, both locally (changes to the properties of the vessels themselves) and globally (the total number of and density of vessels).

Under normal conditions, when deoxygenated blood returns to the heart, it moves through the right atrium and ventricle into the pulmonary arteries which carry it into the lungs. Eventually it reaches the pulmonary capillaries where it undergoes gas exchange with the adjacent alveoli (the terminal pockets at the end of the airways), disposing of waste carbon dioxide and picking up oxygen. It then travels through the pulmonary veins and to the left side of the heart before being pumped to the rest of the body to deliver oxygen. Because gas exchange can only occur effectively under very particular low-pressure conditions, the pulmonary vasculature, and particularly the more muscularized arteries, are highly active and dynamic, constricting or dilating in response to changing need for oxygen, breathing, and cardiac output. In patients with PH, changes occur within the vessels which prevent them from responding normally as needed; this is called pulmonary vascular remodeling. This can include thickening of the vessel wall due to over-proliferation of cells or "plexiform lesions" of structural material which obliterate significant portions of the vasculature. This leads to higher resistance to flow and an impaired ability to dilate in response to higher cardiac output, which causes the right side of the heart to work harder to move blood through the lungs. The heart enlarges and eventually fails as its ability to compensate for the additional workload is exhausted.

Diagnosis, monitoring, and treatment selection for PH patients is complicated. While a variety of methods may be used, the most accurate means of measuring pulmonary pressures is by way of right heart catheterization (RHC), an invasive procedure in which a catheter is run through the heart and into the pulmonary arteries. Besides carrying its own significant health risks, it is expensive and prone to user error. Moreover, it is understood to be an imperfect measurement in principle; the elevated pulmonary pressures RHC measures only occur when very significant portions of the vasculature have been destroyed. The insensitivity of RHC has posed challenges in terms of drug development as well. One therapeutic target for PH drug development are compounds which directly prevent or reverse remodeling (as contrasted with drugs which cause vasodilation to lower pulmonary pressures). No feasible in-vivo method has been demonstrated to allow for direct detection of pulmonary vascular remodeling. One challenge has been that historical research has identified the primary locus of pulmonary vascular remodeling as the "resistance arteries", which are the most highly muscularized pulmonary arteries thought to be responsible for the majority of pulmonary vascular resistance. These vessels, which are at no more than 2 mm in diameter and in most cases much smaller, are mostly below the resolution of readily available in-vivo imaging.

Measurement of pulmonary arterial vessel wall thickness (arterial Vwt) according to the method described herein accurately estimates the blood vessel wall thickness of pulmonary arteries in CT scans. Similarly, pulmonary venous wall thickness (venous Vwt) can be estimated using this method thereby improving accuracy and avoiding an invasive procedure.

Further provided is a method for determining a dysfunction of an organ or system of a subject comprising:

receiving dimensional measurements of vessels (100) within the organ or system or part thereof according to the method described herein;

optionally generating a relationship map;

comparing the dimensional measurements and/or optional relationship map with a reference.

The dimensional measurements of vessels (100) of the organ or system may be include one or more of vessel wall thickness (Vwt), vessel lumen radius (Vlr), and a vessel outer radius (Vor).

Examples of organs include lung (elaborated elsewhere herein), kidney, liver, brain, gastrointestinal tract, eye, uterus, pancreas. Examples of systems include digestive system, vasculature system.

Examples of dysfunctions include pulmonary dysfunctions (elaborated elsewhere herein), atherosclerosis, coronary heart disease.

The reference as used herein is determined from the same measurements of one or more healthy subjects (not suffering from the dysfunction nor related dysfunction). A deviation from a reference may be indicative of a dysfunction. Whether a deviation from a reference is significant can be determined by the skilled person, based on the amount of data, and is typically determined by classic statistical hypothesis tests, after matching both the healthy cohort and cohorts with dysfunctions based on demographic data as gender, age and height.

Pulmonary vascular remodeling—changes to the structure of vasculature of the lung caused by dysfunction—can be measured according the present method. In particular, the relationship maps can indication presence and progression of a dysfunction. Pulmonary vascular remodeling has been shown to play a role in the pathogenesis and progression of lung diseases, including pulmonary hypertension, Acute Respiratory Distress Syndrome (ARDS), COVIS-10 related ARDS, chronic obstructive pulmonary disease (COPD), idiopathic pulmonary fibrosis (IPF), systemic sclerosis (SSc), and asthma.

Accordingly, provided here in is a method for determining a dysfunction of the lung comprising determining dimensional measurements of vessels (100) within the lung.

Further provided is a method for determining a dysfunction of the lung comprising:
  receiving dimensional measurements of vessels (100) within the lung or part thereof according to the method described herein, wherein the vessels are arterial, venous, or both arterial and venous,
  comparing the dimensional measurements with a reference.

The dimensional measurements of vessels (100) of the lung may be include vessel wall thickness (Vwt), in particular arterial vessel wall thickness (Vwt), and the dysfunction may be pulmonary hypertension. An increased arterial vessel wall thickness (Vwt) in the arterial tree compared with a healthy subject is indicative of pulmonary hypertension.

Further provided is a method for determining a dysfunction of the lung comprising:
  generating a relationship map for the lung or part thereof that is a BRTX relationship map;
  comparing the relationship map with a reference.

According to one aspect, vessel wall thickness (Vwt) is arterial vessel wall thickness, and the dysfunction may be pulmonary hypertension.

Further provided is a method for determining a dysfunction of the lung comprising:
  generating a relationship map for the lung or part thereof that is a BVTX relationship map;
  comparing the relationship map with a reference.

According to one aspect, the vessel wall thickness (Vwt) is arterial vessel wall thickness, and the dysfunction may be pulmonary hypertension.

Further provided is a method for determining a dysfunction of the lung comprising:
  generating a relationship map for the lung or part thereof indicating one or more BVX values
  comparing the relationship map with a reference.

According to one aspect, the dysfunction is acute respiratory distress syndrome (ARDS). In particular, the ARDS may be COVID-19 related.

Further provided is a method for determining a dysfunction of the lung comprising:
  generating a relationship map is for the lung or part thereof indicating one or more of
    BV5, BV5-10; and BV10.
  comparing the relationship map with a reference.

According to one aspect, the dysfunction is acute respiratory distress syndrome (ARDS). In particular, the ARDS may be COVID-19 related.

Further provided is a method for determining an efficacy of a treatment for dysfunction of an organ or system of a subject comprising:
  receiving, at at least two different time points, dimensional measurements of vessels (100) within the organ or system or part thereof according to the method described herein;
  optionally generating a relationship map for each of the different time points,
  comparing the dimensional measurements and/or optional relationship map at the different time points to determine the efficacy of the treatment.

By comparing with each other over time the dimensional measurements and/or optional relationship map, an evolution of the vessel responsive to treatment is observed. The course of the treatment can be adjusted responsive to the observations.

The at least two of the different time points may be each from a different stage—pre-treatment stage, treatment stage, post-treatment stage. Alternatively, the at least two of the different time points may be from the treatment stage.

Further provided is a method for determining an efficacy of a treatment for dysfunction of a lung of a subject comprising:
  receiving, at at least two different time points, dimensional measurements of vessels (100) within the lung or part thereof according to the method described elsewhere herein;
  comparing the dimensional measurement at the different time points to determine the efficacy of the treatment.

The dimensional measurements of vessels (100) of the lung may be include vessel wall thickness (Vwt), in particular arterial vessel wall thickness (Vwt), and the dysfunction may be pulmonary hypertension.

Further provided is a method for determining an efficacy of a treatment for dysfunction of a lung of a subject comprising:
  receiving, at at least two different time points, dimensional measurements of vessels (100) within the lung or part thereof according to the method described elsewhere herein;
  generating, for each time point, a relationship map that is a BRTX relationship map;
  comparing the relationship maps at the different time points to determine the efficacy of the treatment.

According to one aspect, the vessel wall thickness, is arterial vessel wall thickness (Vwt), and the dysfunction may be pulmonary hypertension.

Further provided is a method for determining an efficacy of a treatment for dysfunction of a lung of a subject comprising:
  receiving, at at least two different time points, dimensional measurements of vessels (100) within the lung or part thereof according to the method described elsewhere herein;
  generating, for each time point, a relationship map that is a BVTX relationship map;
  comparing the relationship maps at the different time points to determine the efficacy of the treatment.

According to one aspect, the vessel wall thickness (Vwt), is arterial vessel wall thickness, and the dysfunction may be pulmonary hypertension.

Further provided is a method for determining an efficacy of a treatment for dysfunction of a lung of a subject comprising:

receiving, at at least two different time points, dimensional measurements of vessels (100) within the lung or part thereof according to the method described elsewhere herein;

generating, for each time point, a relationship map for the lung indicating one or more BVX values;

comparing the relationship maps at the different time points to determine the efficacy of the treatment.

According to one aspect, the dysfunction is acute respiratory distress syndrome (ARDS). In particular, the ARDS may be COVID-19 related.

Further provided is a method for determining an efficacy of a treatment for dysfunction of a lung of a subject comprising:

receiving, at at least two different time points, dimensional measurements of vessels (100) within the lung or part thereof according to the method described elsewhere herein;

generating, for each time point, a relationship map for the lung indicating one or more of BV5, BV5-10; and BV5-10;

comparing the relationship maps at the different time points to determine the efficacy of the treatment.

According to one aspect, the dysfunction is acute respiratory distress syndrome (ARDS). In particular, the ARDS may be COVID-19 related.

Any of the methods described herein may be implemented on a computer. A computer typically comprises a processor and memory. The method may be performed using a standard computer system such as an Intel Architecture IA-32 based computer system 2, and implemented as programming instructions of one or more software modules stored on non-volatile (e.g., hard disk or solid-state drive) storage associated with the corresponding computer system. However, it will be apparent that at least some of the steps of any of the described processes could alternatively be implemented, either in part or in its entirety, as one or more dedicated hardware components, such as gate configuration data for one or more field programmable gate arrays (FPGAs), or as application-specific integrated circuits (ASICs), for example.

Further provided is a system comprising a computer or system configured to carryout any of the methods described herein. The system comprises circuitry configured performing the method of the invention.

Further provided is a computer program or computer program product having instructions which when executed by a computing device or system cause the computing device or system to perform (each of the steps of) the method described herein.

A computer readable medium having stored thereon instructions which when executed by a computing device or system cause the computing device or system to perform (each of the steps of) the method described herein.

A data stream which is representative of a computer program or computer program product having instructions which when executed by a computing device or system cause the computing device or system to perform (each of the steps of) the method described herein.

The method described herein was applied to a 3D phantom. 3D tubular structures with known diameter and wall thickness were randomly generated. A fixed wall thickness-to-radius ratio of 1/3 was chosen. The tubes included change of direction, bifurcations, diameter reduction. Noise and blurring added to mimic CT acquisition, influence of slice thickness. Estimation of wall thickness (compared with outer vessel radius determined from Frangi vesselness) according to the presently-described method was made. The results are shown in FIG. 6. Medial wall thickness was the wall thickness according to the presently-described method was made; expected wall thickness was the value that was expected from the measured vessel radius according to the Frangi method; while true wall thickness was the groundtruth value of the phantom. The results show there is a small deviation between the groundtruth radius and the measured radius value.

The method described herein was applied to a healthy subjects (n=7) and to subjects with pulmonary hypertension (n=3). Estimation of arterial wall thickness (compared with outer vessel radius determined from Frangi vesselness) according to the presently-described method was made. The results are shown in FIG. 7.

The invention claimed is:

1. A method for dimensional measurement of a vessel of a subject that is a bodily fluid-conducting vessel comprising:
receiving image data comprising a three-dimensional medical image containing the vessel;
obtaining from the image data an image patch that is a two-dimensional image containing a transverse cross-section of the vessel;
generating from the image patch, a set of rays (R1 to RX), wherein each ray (R1 to RX) is a straight line, one end contacting a centre point of an outer footprint of the vessel and at the other end extending beyond the outer footprint of the vessel, wherein each ray (R1 to RX) has a different direction;
determining for each ray (R1 to RX) an image intensity profile of the image patch along the ray as a function of distance from the centre point;
determining from the image intensity profile along each ray (R1 to RX), one or more of a ray wall thickness (RXwt), a ray lumen radius (RXlr), and a ray outer radius (RXor);
determining dimensional measurements of the vessel comprising one or more of:
a vessel wall thickness (Vwt) determined from a median of the ray wall thicknesses (RXwt) in the set of rays (R1 to RX),
a vessel lumen radius (Vlr) determined from a median of the ray lumen radii (RXlr) in the set of rays (R1 to RX),
a vessel outer radius (Vor) determined from a median of the ray outer radii (RXor) in the set of rays (R1 to RX).

2. The method according to claim 1, wherein the step of:
determining from the image intensity profile along each ray (R1 to RX), one or more of the ray wall thickness (RXwt), ray lumen radius (RXlr), and ray outer radius (RXor) comprises fitting a double inverse sigmoid function to the image intensity profile along each ray (R1 to RX).

3. The method according to claim 2, wherein the double inverse sigmoid function is:

$$f(x) = \frac{A_1 - A_2}{1 + \exp\left(\frac{x - (r - d)}{\sigma}\right)} + \frac{A_2 - B}{1 + \exp\left(\frac{x - r}{\sigma}\right)} + B$$

wherein $A_1$ is vessel lumen intensity, $A_2$ is vessel wall intensity, B is background intensity, r is ray outer radius (RXor), d is ray wall thickness (RXwt) and sigma is a measure of imaging device resolution.

4. The method according to claim 1, wherein:
a plurality of image patches is obtained for one or more vessels within the same organ, system, or part thereof, thereby obtaining a plurality of vessel dimensional measurements within the same organ, system, or part thereof; and
the plurality of image patches is at different locations along the same vessel; or the plurality of image patches is of different vessels within the same organ, system, or part thereof; or both.

5. The method according to claim 4, further comprising a step of generating a relationship map for the organ, or system, or part thereof, wherein the relationship map is a chart or data showing relationship between a first parameter that is the dimensional measurement for the organ, or system, or part thereof, and at least one subsequent parameter.

6. A method for determining a dysfunction of an organ or system of a subject comprising:
determining dimensional measurements of vessels within the organ or system or part thereof according to the method of claim 1
comparing the dimensional measurements with a reference, thereby determining a dysfunction of an organ or system of the subject.

7. The method of claim 6 further comprising the step of generating a relationship map and comparing the relationship map with a reference.

8. A method for determining a dysfunction of a lung comprising:
receiving dimensional measurements of vessels within the lung or part thereof according to the according to the method of claim 1, wherein the vessels are arterial, venous, or both arterial and venous,
comparing the dimensional measurements with a reference thereby determining a dysfunction of an organ of the subject.

9. The method of claim 8, wherein the dimensional measurements of vessels of the lung comprise vessel wall thickness (Vwt) and the dysfunction is pulmonary hypertension.

10. The method of claim 9, wherein the vessel wall thickness (Vwt) is arterial vessel wall thickness.

11. A method for determining a dysfunction of a lung comprising:
generating a relationship map for the lung or part thereof that is a Blood-Radius-Thickness (BRTX) relationship map, wherein a first parameter of the relationship map is lung vascular vessel wall thickness (Vwt) in the lung or part thereof determined according to the method of claim 1, and a subsequent parameter of the relationship map is lung vascular vessel radius at the position at which the vessel wall thickness was measured; and
comparing the relationship map with a reference.

12. The method of claim 11, wherein the vessel wall thickness (Vwt) is arterial and the dysfunction is pulmonary hypertension.

13. A method for determining a dysfunction of a lung comprising:
generating a relationship map for the lung or part thereof that is a Blood-Volume-Thickness (BVTX) relationship map, wherein a first parameter of the relationship map is lung vascular vessel wall thickness (Vwt) in the lung or part thereof determined according to the method of claim 1, and a subsequent parameter of the relationship map is lung vascular vessel volume at the position at which the vessel wall thickness was measured, and
comparing the relationship map with a reference.

14. The method of claim 13, wherein the vessel wall thickness (Vwt) is arterial and the dysfunction is pulmonary hypertension.

15. A method for determining an efficacy of a treatment for dysfunction of an organ or system of a subject comprising:
determining, at least two different time points, dimensional measurements of vessels within the organ or system or part thereof according to the method of claim 1; and
comparing the dimensional measurements at the different time points to determine the efficacy of the treatment.

16. The method of claim 15, further comprising generating a relationship map for each of the different time points and comparing the relationship map at the different time points.

17. A method for determining an efficacy of a treatment for dysfunction of a lung of a subject comprising:
determining, at least two different time points, dimensional measurements of vessels within the lung or part thereof according to the method of claim 1; and
comparing the dimensional measurement at the different time points to determine the efficacy of the treatment.

18. The method of claim 17, wherein the dimensional measurements of vessels of the lung comprise vessel wall thickness (Vwt) and the dysfunction is pulmonary hypertension.

19. The method of claim 18, wherein the vessel wall thickness is arterial wall thickness.

20. A method for determining an efficacy of a treatment for dysfunction of a lung of a subject comprising:
determining, at least two different time points, dimensional measurements of vessels within the lung or part thereof according to the method of claim 1;
generating, for each time point, a relationship map that is a Blood-Radius-Thickness (BRTX) relationship map, wherein a first parameter of the relationship map is lung vascular vessel wall thickness (Vwt) in the lung or part thereof determined according to the method of claim 1, and a subsequent parameter of the relationship map is lung vascular vessel radius at the position at which the vessel wall thickness was measured; or a Blood-Volume-Thickness (BVTX) relationship map, wherein a first parameter of the relationship map is lung vascular vessel wall thickness (Vwt) in the lung or part thereof determined according to the method of claim 1, and a subsequent parameter of the relationship map is lung vascular vessel volume at the position at which the vessel wall thickness was measured; and
comparing the respective relationship maps at the different time points to determine the efficacy of the treatment.

21. The method of claim 20, wherein the vessel wall thickness (Vwt) is arterial and the dysfunction is pulmonary hypertension.

22. A system comprising:
a processor; and
a memory in communication with the processor,
wherein the processor and the memory are configured to carry out the method according to claim 1.

23. A non-transitory computer readable medium having instructions which when executed by a computing device or system cause the computing device or system to perform the method according to claim 1.

* * * * *